United States Patent
Hung

(10) Patent No.: US 7,333,141 B2
(45) Date of Patent: Feb. 19, 2008

(54) RESAMPLING METHODS FOR DIGITAL IMAGES

(75) Inventor: Ching-Yu Hung, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 861 days.

(21) Appl. No.: 10/692,156

(22) Filed: Oct. 22, 2003

(65) Prior Publication Data
US 2004/0145501 A1 Jul. 29, 2004

Related U.S. Application Data

(60) Provisional application No. 60/420,319, filed on Oct. 22, 2002.

(51) Int. Cl.
*H04N 5/262* (2006.01)

(52) U.S. Cl. ............................. 348/240.2; 348/222.1; 382/298

(58) Field of Classification Search ........... 348/240.94, 348/240.1, 240.2, 222.1, 333.12, 581; 382/298
See application file for complete search history.

(56) References Cited

U.S. PATENT DOCUMENTS 7,024,051 B2 *  4/2006 Miller et al. ................. 382/263
7,119,845 B2 * 10/2006 Lafon ......................... 348/441

* cited by examiner

*Primary Examiner*—Lin Ye
*Assistant Examiner*—Gevell Selby
(74) *Attorney, Agent, or Firm*—Wade James Brady, III; Frederick J. Telecky, Jr.

(57) ABSTRACT

Polyphase filtering, such as resampling for image resizing, on a processor with parallel output units is cast in terms of data access blocks and data coverage charts to increase processor efficiency. Automatic generation of implementations corresponding to input resampling factors by computation cost comparisons.

4 Claims, 15 Drawing Sheets

*FIG. 5a*

| ARCHITECTURE KERNEL | EXPLANATION | EXAMPLE |
|---|---|---|
| SINGLE POINT ○ | SINGLE-THREAD FILTERING, GETTING ONE DATA POINT AT A TIME. THE NEXT ACCESS CAN STAY ON THE SAME POINT, OR MOVE FOR A FIXED DISTANT. THIS IS THE MOST FLEXIBLE PATTERN. HOWEVER, THERE IS USUALLY TIME ASSOCIATED WITH EACH LEVEL OF LOOPING, WHICH IS NEEDED TO IMPLEMENT CHANGING OF STEPPING DISTANCE IN A REGULAR MANNER. A PARALLEL DSP PERFORMING VERTICAL FILTERING OFTEN USE THIS SINGLE-POINT KERNEL, AS ITS PARALLELISM IS APPLIED TO DIFFERENT FILTERING PROBLEMS (FOR VERTICAL FILTERING, EACH COLUMN IS OPERATED INDEPENDENTLY AND IS THUS A SEPARATE PROBLEM) | THIS IS FOR 5-TAP-PER-OUTPUT FILTERING GOING ON FOR 7 OUTPUTS, FOR ONE DATA ACCESS BLOCK FOR 7/D RESAMPLING |
| 4-WIDE ○○○○ | DSP WITH FIXED, 4-WIDE, DATA ACCESS, AND CAPABILITY TO COMPUTE INNER-PRODUCT WITH COEFFICIENT ARRAY AND PRODUCING A SINGLE SUM. TO BE EFFICIENT FOR FILTERING, THE STARTING POINT SHOULD BE ON ANY ALIGNMENT | THIS IS 4-TAP-PER-OUTPUT FILTERING FOR A 6/D RESAMPLING |

| | | |
|---|---|---|
| 4-TALL ○○○○ | DSP WITH 4 PARALLEL EXECUTION UNITS, AND THEY ARE ALL FED WITH THE SAME SINGLE DATA POINT. THERE IS A SIGNIFICANT DISTINCTION IN DSP ARCHITECTURE THAT AFFECTS HOW WE CAN USE THIS AND MANY OTHER ARCHITECTURE KERNELS: WRITING IN ANY ALIGNMENT, OR WRITING ONLY ON $2^N$-WORD ALIGNMENT. THE FORMER CAN BE USED TO IMPLEMENT ANY U FACTOR. THE LATTER CAN ONLY WORK WITH U BEING MULTIPLE OF $2^N$. WHEN U IS NOT A MULTIPLE OF 4, FOR EXAMPLE, WE UPSCALE U AND D SO THAT THEY ARE, AT THE EXPENSE OF EFFICIENCY | THIS IS A WRITE-ANY-ALIGNMENT ARCHITECTURE IMPLEMENTING A 7/D RESAMPLING WITH 3-TAP-PER-OUTPUT FILTERS. NOTE THAT 8 OUTPUTS ARE COMPUTED AND THEN ONE IS THROWN AWAY |
| 1:1 SLOPE, 4 OUTPUTS | DSP WITH 4 PARALLEL EXECUTION UNITS, AND THEY ARE FED WITH 4 DATA POINTS, ONE FOR EACH. TO BE EFFICIENT FOR FILTERING, THE 4 INPUTS NEED TO BE ON ANY WORD ALIGNMENT | THIS IS FOR A 3/D RESAMPLING, WITH 4-TAP-PER-OUTPUT FILTERS. NOTE THAT 4 OUTPUTS ARE COMPUTED AND THEN ONE IS THROWN AWAY |
| 1:2 SLOPE, 2 OUTPUTS | DSP THAT CAN TAKE IN 4 INPUTS, AND PERFORM $acc\_A = acc\_A + c0*d0 + c1*d1$, $acc\_B = acc\_B + c2*d2 + c3*d3$ TO BE EFFICIENT FOR FILTERING, THE INPUTS NEED TO BE ON ANY WORD ALIGNMENT | THIS IS FOR A 4/D RESAMPLING, WITH 4-TAP-PER-OUTPUT FILTERS |

| RESAMPLING FACTOR | Multiply_Factor | H_Arch_Kernel | FILTER TAPS | DATA STEP TO NEXT GROUP OF OUTPUTS | STARTING ACCESS DATA POINT |
|---|---|---|---|---|---|
| 4/3 HORIZONTAL | 1 | 1:1 SLOPE 4 OUTS | 4 | N/A | -2 |
| VERTICAL | | | 4 | 1 | -2 |
| 5/3 HORIZONTAL | 1 | 2:1 SLOPE 4 OUTS | 4 | 2 | -1 |
| VERTICAL | | | 5 | 1 | -3 |
| 2/1 HORIZONTAL | 2 | 2:1 SLOPE 4 OUTS | 4 | N/A | -1 |
| VERTICAL | | | 5 | 0 | -1 |
| 7/3 HORIZONTAL | 1 | 2:1 SLOPE 4 OUTS | 5 | 2 | -2 |
| VERTICAL | | | 6 | 0 | -1 |
| 8/3 HORIZONTAL | 1 | 4 TALL | 5 | 1 | -1 |
| VERTICAL | | | 6 | 0 | -1 |
| 3/1 HORIZONTAL | 1 | 4 TALL | 4 | N/A | -1 |
| VERTICAL | | | 4 | 0 | -1 |
| 10/3 HORIZONTAL | 1 | 4 TALL | 5 | 1 | -1 |
| VERTICAL | | | 6 | 0 | -1 |

*FIG. 13*

RESAMPLING METHODS FOR DIGITAL IMAGES

CROSS-REFERENCE TO RELATED APPLICATIONS

This application claims priority from provisional application No. 60/420,319, filed Oct. 22, 2002.

BACKGROUND OF THE INVENTION

The present invention relates to digital signal processing, and more particularly to resembling to adjust sampling rates.

Various consumer products use digital signals, such as music on CDs, images in digital cameras, and video on DVDs, and multiple sampling rates have been used create the digital files. The playout/display device for such a digital file may require a sampling rate differing from that of the digital file to be played, and thus resembling to adjust the sampling rate is needed. For example, music may be sampled at 16 KHz, 44.1 KHz, or 48 KHz, and images at 1600×1200 pixels or 640×480 pixels. The resembling factor is the ratio of the new sampling rate divided by the original sampling rate.

It is generally easier to implement resembling when the resembling factor is either an integer (upsampling) or the reciprocal of an integer (downsampling). Fractional resembling (resembling factor is U/D where U and D are integers greater than 1) is more complicated to implement but frequently required in real applications. For example, the digital zoom feature of camcorders and digital cameras often involves a series of finely-spaced zoom factors such as 1.1×, 1.2×, 1.3×, and so on.

Crochiere et al, Multirate Digital Signal Processing (Prentice-Hall 1983) includes resembling theory and structures. In particular, FIG. 2a shows generic resembling (a rate converter) which first expands the sampling rate by a factor of U, lowpass filters to eliminate aliasing, and then compresses the sampling rate by a factor of D. The sampling rate expansion is just inserting 0s, and the sampling rate compression is just discarding samples. The lowpass filter leads to computational complexity, and a polyphase filter implementation as illustrated in FIG. 2b helps avoid unnecessary multiplications and additions. However, such a polyphase filter implementation inherently requires irregular data access in the sense that input/output addressing involves fractional arithmetic.

Generally, single-thread, VLIW (very long instruction word), SIMD (single instruction, multiple dispatch), and vector DSP processor architectures have a high level of efficiency for multiply-accumulate (MAC) operations with regular data access in the sense of simple, well-behaved, multi-dimensional addressing. In a conventional single-thread DSP, simple and regular data access is sometimes free but otherwise requires little computation time. In a VLIW DSP, simple and regular data access can execute simultaneously with MAC instructions, and thus is often free. A SIMD DSP often requires that the data be organized sequentially to align with the wide memory/register word, so simple and regular access is mandatory in order to take advantage of the SIMD features. A vector DSP usually has hardware address generation and loop control, and these hardware resources cannot deal with anything but simple and regular addressing. Straightforward implementation of fractional resembling on various digital signal processor architectures is thus fairly inefficient.

Thus there is a problem to adapt polyphase filter resembling methods for efficient operation on DSPs.

SUMMARY OF THE INVENTION

The present invention provides regular data addressing for polyphase filtering of resembling by

BRIEF DESCRIPTION OF THE DRAWINGS

The drawings are heuristic for clarity.

FIG. 5 lists example implementations.

FIG. 13 lists parameters of an example.

DESCRIPTION OF THE PREFERRED EMBODIMENTS

1. Overview

Figure 1A:
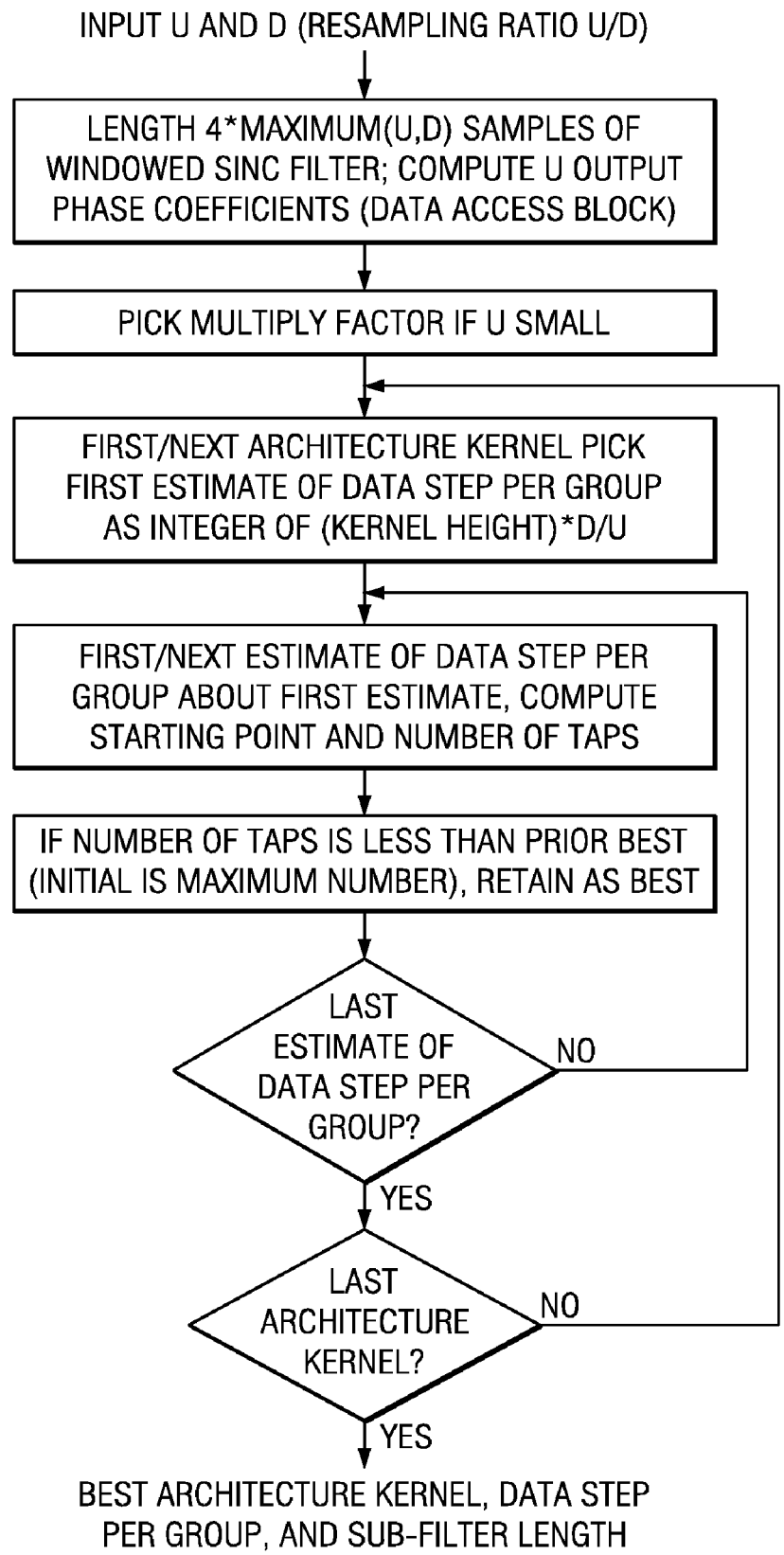
FIG. 1a is a flow diagram.

The preferred embodiment methods of resembling using a processor with multiple parallel execution units (e.g., multiply-accumulate units) include run-time implementation analysis in response to an input resembling ratio as illustrated in FIG. 1a. Resembling of images uses horizontal and vertical filtering passes with filter coefficients derived from a windowed sinc filter. The methods implement a polyphase sub-filter structure and pick execution unit architecture and implementation parameters to minimize computation cost (e.g., sub-filter length).

Figure 1B:
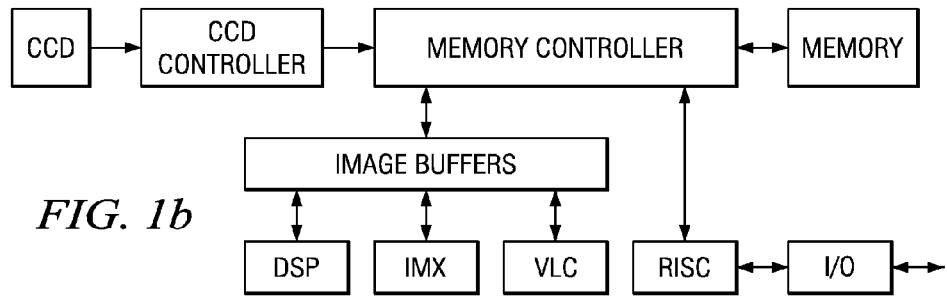
FIG. 1b shows a digital camera.

The preferred embodiment methods apply to a variety of platforms, including conventional single-thread, VLIW (very long instruction word), SIMD (single instruction, multiple dispatch), and vector DSP processor architectures. For example, FIG. 1b shows a digital camera with an image accelerator (IMX) which includes multiple (e.g., 4 or 8) parallel MAC units. Zoom selection input drives optical zoom (if any) and/or electronic resembling zoom that invokes stored and/or computed resembling filterings which apply the IMX parallel processing capabilities to captured images.

2. Upsampling, Downsampling, and Fractional Resembling

Figure 2A:
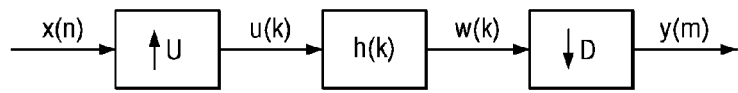
FIGS. 2a-2c illustrate resembling.
Figure 2B:
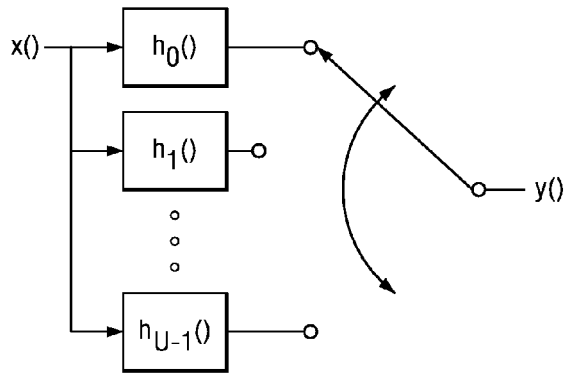

First consider the polyphase filter structure of FIG. 2b for the upsampling (sampling rate expander plus lowpass filtering) by an integral factor of U in FIG. 2a. Let $x(n)$ be the input stream of samples; then the insertion of U-1 0s between successive samples x(n) yields the expanded-sampling-rate sample sequence u(k):

$$u(k) = x(n) \text{ if } k = nU$$
$$= 0 \quad \text{if } k \text{ is not a multiple of } U$$

The anti-aliasing lowpass filter h(k) can thus have a bandpass of at most 1/U to avoid aliasing. In general, an FIR fiter is preferred over an IIR filter: FIR filters have linear phase and are easier to implement on most DSP platforms. Presume that the lowpass filter is an FIR filter with length L kernel h(k), then the upsampled output y(k) is given by the convolution:

$$y(k)=\Sigma_{0 \leq j \leq L-1} u(k-j)h(j)$$

The lowpass filter in practice typically is a windowed version of the standard sinc lowpass filter kernel and thus symmetric, so for notational convenience replace j with –j in the sum so the convolution looks formally like an inner product. (When the lowpass filter kernel is not symmetric, then reverse order the coefficients accomplishes the same effect.)

The length, L, of the filter kernel is a tradeoff between anti-aliasing performance and computational complexity. In general, the longer the filter kernel, the better the output quality, at the expense of more computation and longer latency.

Further, in the sampling rate expanded sequence, x'(k), most of the samples (at least U–1 out of every U) equal 0, so the filtering computation has many multiplications by 0. A polyphase filter implementation avoids these superfluous multiplications by splitting the filter kernel into U phases, and cycling through the phases. In particular, define the U sub-filter kernels by downsampling the filter kernel by a factor of U for each:

$$H_0(k)=h(Uk)$$
$$H_1(k)=h(Uk+1)$$
$$H_2(k)=h(Uk+2) \ldots$$
$$H_{U-1}(k)=h(Uk+U-1)$$

Thus the filtering of u(k) with h(k) can be rewritten:

$$y(k) = \sum_{0 \leq j \leq L-1} u(k+j)h(j)$$
$$= \sum_{0 \leq i \leq (L-1)/U} x(m+i)H_n(i)$$
$$\text{when } k = mU + n \text{ for } 0 \leq n \leq U - 1$$

FIG. 2b illustrates this periodic cycling of the sub-filter kernels with each sub-filter kernel only of length at most L/U. The original sample sequence, x(n), is sent simultaneously to all of these U sub-filters, but the filters operate at the input rate. The upsampling by a factor of U comes from the sequential clocking out of the outputs of the U sub-filters, one into each output time slot. Each output sample requires one sub-filtering job, involving about L/U multiplications. This represents a reduction by a factor of U in computation complexity.

For downsampling by an integer factor of D, the preliminary lowpass filtering must reduce the bandwidth by a factor of 1/D and then the downsampling retains only every Dth filter output samples and discards the rest. The center plus righthand portions of FIG. 2a show the lowpass filtering by h(k) and downsampling by D. Generally, for an input sequence u(n) the lowpass filtering with h(k) is:

$$w(k)=\Sigma_{0 \leq j \leq L-1} u(k+j)h(j)$$

This is the same as previously described but not requiring the special form of u(n) as an upsampled input sequence. Then the downsampling is:

$$y(n)=w(nD)$$

Again, there is inefficiency of straightforward implementation: computing all of the filterings w(k) is unnecessary because D–1 out of every D is discarded. Indeed, $$y(n) = w(nD)$$
$$= \sum_{0 \leq j \leq L-1} u(nD + j)h(j)$$

so the input samples are shifted by D samples for each filtering.

Figure 2C:
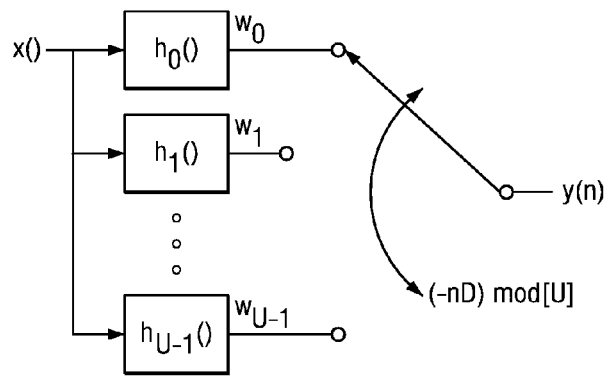

FIG. 2a shows an overall resembling by a factor of U/D (U and D may be taken as relatively prime integers greater than 1); the lowpass filter reduces bandwidth by a factor of max(U,D) to avoid aliasing. Again, a straightforward implementation has computational inefficiencies. However, combining the foregoing upsampling and downsampling leads to the implementation of FIG. 2c; an upsampling by polyphase filtering and downsampling by control of the output selection switch to the sub-filters: output y(n) comes from sub-filter –nD mod[U]. This means output y(n) will pick up one in every D samples from the bank of U sub-filters. Input data access can be obtained by sliding the filter envelope according to output phase, as in the integer-factor upsampling polyphase implementation.

Figure 4A:
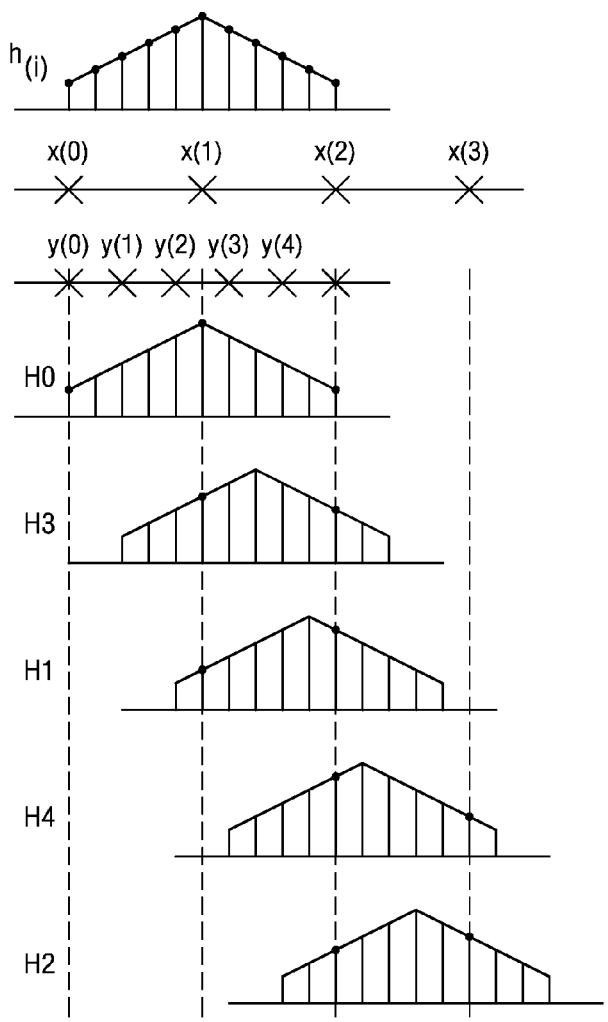
FIGS. 4a-4b are graphs of downsampling polyphase filters and corresponding data access block.

FIG. 4a illustrate a few outputs from the polyphase filter for the example of U=5, D=2, with an 11-tap lowpass filter. In particular, the first row of FIG. 4a shows the eleven filter coefficients h(j); the second row shows the input samples x(k) at a spacing of 5 samples due to U=5; the third row shows output samples y(n) with a spacing of 2 samples due to D=2; the fourth panel shows sub-filter $H_0$ with coefficients h(0), h(5), h(10); the fifth row shows the sub-filter $H_3$ with coefficients h(3), h(8); the sixth row shows the sub-filter $H_1$ with coefficients h(1), h(6); the seventh row shows sub-filter $H_4$ with coefficients h(4), h(9); and the eighth row shows sub-filter $H_2$ with coefficients h(2), h(7). The computations are:

$$y(0) = w_0(0)$$
$$= x(0)H_0(0) + x(1)H_0(1) + x(2)H_0(2)$$
$$= x(0)h(0) + x(1)h(5) + x(2)h(10)$$
$$y(1) = w_3(1) \; (3 \equiv -(1)(2)\bmod[5])$$
$$= x(1)H_3(0) + x(2)H_3(1)$$
$$= x(1)h(3) + x(2)h(8)$$

-continued $y(2) = w_1(1)$ $(1 \equiv -(2)(2)\bmod[5])$ $= x(1)H_1(0) + x(2)H_1(1)$ $= x(1)h(1) + x(2)h(6)$ $y(3) = w_4(2)$ $(4 \equiv -(3)(2)\bmod[5])$ $= x(2)H_4(0) + x(3)H_4(1)$ $= x(2)h(3) + x(3)h(8)$ $y(4) = w_2(2)$ $(2 \equiv -(4)(2)\bmod[5])$ $= x(2)H_2(0) + x(3)H_2(1)$ $= x(2)h(1) + x(3)h(6)$ $y(5) = w_0(2)$ $(0 \equiv -(5)(2)\bmod[5])$ $= x(2)H_0(0) + x(3)H_0(1) + x(4)H_0(2)$ $= x(2)h(0) + x(3)h(5) + x(4)h(10)$ $y(6) = w_3(3)$ $(3 \equiv -(6)(2)\bmod[5])$ $= x(3)H_1(0) + x(4)H_1(1)$ $= x(3)h(1) + x(4)h(6)$ and so on where $w_m(n)$ is the nth output sample of the mth sub-filter with filter kernel $H_m$. Generally, $y(n) = W_{-nD\,\bmod[U]}(\text{floor}[(nD+g)/U])$ where g is a fixed offset which equals 4 in this example.

3. Data Access Blocks and Architecture Kernels

A data access pattern diagram can illustrate the polyphase filtering. The data access pattern is a two-dimensional plot of dots representing the polyphase filtering with the input sample index running horizontally from left to right and the filtered output sample index running vertically from top down: dots on a row denote data points contributing to the output corresponding to that row and sub-filter. The pattern repeats, so a finite plot suffices. Indeed, for the general case of resembling by a factor of U/D, the pattern repeats every U outputs for every horizontal increment of D inputs. Thus a K/U×U data access block plus indication of the D increment, such as by an empty block, for repeat shows the data access.

Figure 3A:
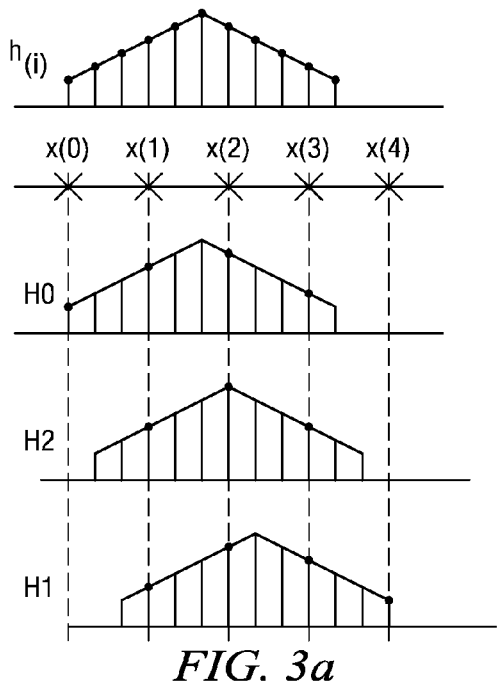
FIGS. 3a-3c are graphs of upsampling polyphase filters and corresponding data access block.
Figure 3B:
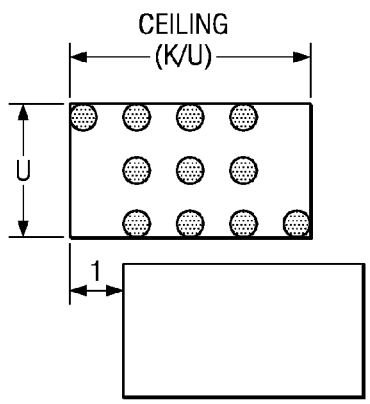

FIGS. 3a-3b give an example with an 11-tap FIR filter and upsampling by a factor of U=3. The first row of FIG. 3a shows the filter kernel h(i) with h(0) at the left end and h(5) the maximum value in the middle and h(10) at the right end; the second row shows x(n) values separated by two 0s for the upsampling; the third row shows the $H_0$ sub-filter with coefficients h(0), h(3), h(6), h(9) from the first row h(i) and aligned with the x(0), x(1), x(2), x(3) values to compute y(0)=x(0)h(0)+x(1)h(3)+x(2)h(6)+x(3)h(9). The fourth row shows the coefficients of sub-filter $H_2$ coefficients as h(2), h(5), h(8) and offset 1 to align with the x(n) for computation y(2)=x(1)h(2)+x(2)h(5)+x(3)h(8); and the fifth row shows the coefficients of sub-filter $H_1$ coefficients as h(1), h(4), h(7), h(10) and offset 2 to align with the x(n) for computation y(2)=x(1)h(1)+x(2)h(4)+x(3)h(7)+x(4)h(10).

FIG. 3b shows the data access block for the example of FIG. 3a with no downsampling (D=1) and the 5×3 block repeats for output y(3), y(4), y(5), as indicated by the empty 5×3 block.

Generally for upsampling by an integer yields a rectangular data access block with some missing spots due to head and tail of some of the output phases that happen to fall outside of the kernel envelope and thus become zeros. The height of the data access block is U and the width is the smallest integer at least as large as K/U where K is the length of the original filter kernel in output sample scale. For the example of FIGS. 3a-3b, K=11 and the width is 4.

Figure 3C:
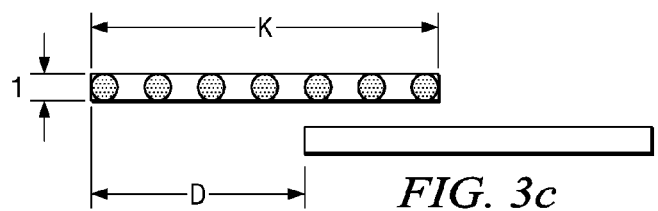

FIG. 3c shows the data access block for a downsampling by a factor of D=4 following a 7-tap lowpass filter. Downsampling by an integer factor of D generally has a horizontal 1-dimensional array in the data access block because the height is U=1. The width of the block is K where K is the length of the original filter in input sample scale, and the increment to the next data access block is D. This method takes K multiplications per output, which is 1/D times the rate of the straightforward implementation.

Figure 4B:
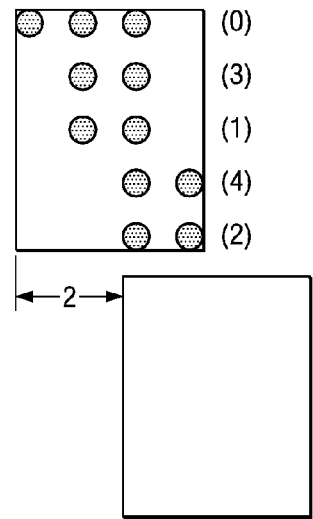

FIG. 4b illustrates the access data block for the FIG. 4a resembling example. Sub-filter numbers are noted in parentheses for convenience in ordering the sub-filters in the bank for easier implementation. The height of the data access block is U=5, and the horizontal increment for the next iteration is D=2. The dots form a generally diagonal band running from upper left to lower right and with a slope of −U/D. The rows have varying widths, but generally the width is roughly K/U; therefore the width of the data access block roughly equals D+K/U.

The data access pattern provides a good visual cue of the computation:

(i) U and D can be observed as the height of the data access block and the iteration increment. When the data access block is wide and tall (in units of dots), the resembling is accurate. In contrast, then the data access block is small, the resembling is coarse. Much wider than tall blocks means large-factor downsampling, and much taller than wide blocks means large-factor upsampling.

(ii) The number of dots represents the minimal number of MAC operations per U outputs, as well as the storage requirement for the filter coefficients.

(iii) Overlap of one row to the next row represents the coverage of input points in the resembling process. When there is no or little overlap, the quality of the resembling may be questionable. When there is much overlap, except for the case of large-factor-upsampling, the filter may be longer than necessary.

Integer factor upsampling and integer-factor downsampling are not too difficult to implement. Once a filter kernel is designed, the upsampling or downsampling can be derived from a simple FIR implementation of the filter: the downsampling case by shifting inputs by D, and the upsampling case by splitting the filter into U sub-filters and cycling among them.

Fractional resembling is more difficult. With the original filter coefficients, splitting them into U phases is not a problem. Use the −nD mod[U] expression to compute the order of use of the phases, but the pattern repeats for each group of U outputs, so simply reorder the sub-filters in advance so the output cycles through them sequentially.

Fractional resembling has the challenge of stepping through the inputs. Input access points from one output to the next vary, and computing the access points on the fly requires division (except when U is a power of 2, the division becomes a shift). Such division should be avoided carrying out such computation in run time if at all possible. Even is the accesses form a group of U outputs is hard-coded, the irregular data access makes parallel and pipelined processing difficult.

The preferred embodiment methods have an overall strategy to determine what kind of data access in filtering a target processor architecture can do efficiently, and then rearrange the polyphase filtering for resembling in such a way to achieve maximal efficiency on the target processor. Each of the architectures, and often each specific device within the architecture group, has its own characteristics, constraints, and cost function on addressing regular data pattern and on performing filtering operations. Thus the preferred embodiments introduce a notation to categorize efficient usage model of the processors, to allow for analysis of efficient implementations.

In particular, each target architecture has its natural ways of stepping through data points and applying MAC operations on them to realize filtering. Single-thread DSPs usually have a lot freedom. Parallel DSPs usually have certain constraints. Each basic pattern is called an Architecture Multiply-Accumulate Kernel, or architecture kernel for short.

The notation is similar to the data access pattern and data access block in the foregoing. The data point index again is horizontal, and output points are again vertical, which in hardware means multiple accumulators or registers. Note that an architecture kernel does not necessarily mean what the DSP can do in a single cycle. The arch kernel is what the DSP can conveniently do from control point of view. It can be a single cycle, several cycles inside the inner-most loop, or what the inner-most loop can do.

There are many possible architecture kernels; FIG. 5 lists a few examples with explanations. Typically, a parallel DSP has a few feasible architecture kernels, and they can be picked according to the dta access pattern. Often a single-thread DSP has the single data point as the building block, and can mmplement nay regular-shaped data access pattern. Due to the cost of looping and addressing, the simpler access pattern often leads to higher efficiecy in the implementation.

Figure 6A:
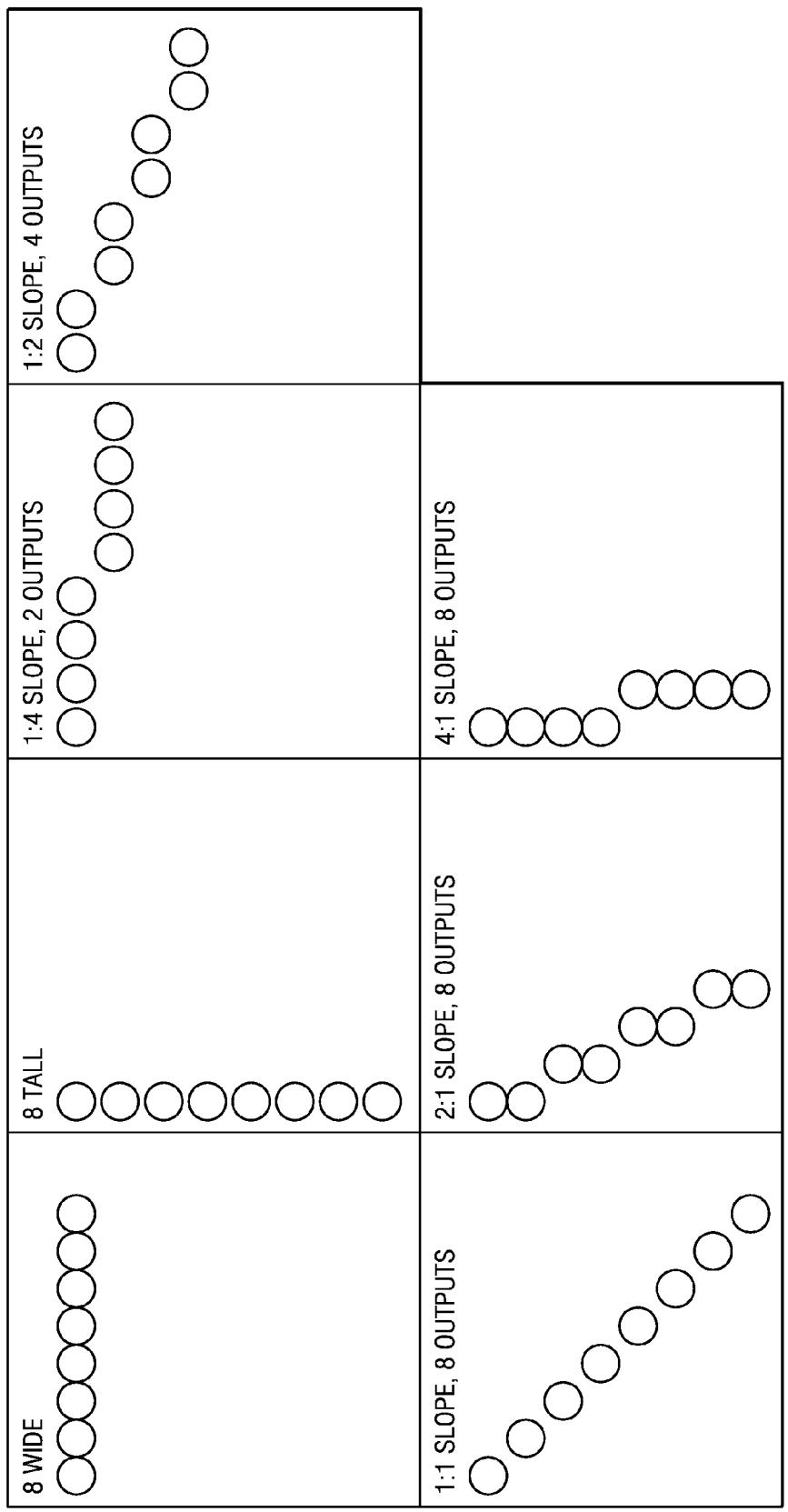
FIGS. 6a-6b illustrate architecture kernels.
Figure 6B:
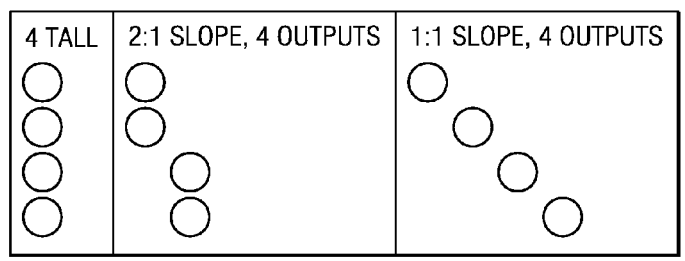

As another example, the image accelerator of the DM310 from Texas Instruments Inc. has 8 MAC units and 6-level looping; and the write alignment corresponds to the number of outputs: 8-word, 4-word, 2-word, or 1-word. FIG. 6a shows the various architecture kernels of the accelerator with 8 outputs, and FIG. 6b shows the 4 output architecture kernels for a simpler accelerator with 4 MAC units and 4-level looping with any-word write alignment.

A conventional DSP processor, either single-MAC-single-thread or multiple-MAC-VLIW, usually can implement many possible architecture kernels, with varying costs. Making efficient use of such architectures for fracitonal resembling involves tight assembly coding of possible architecture kernels and tabulating the cycle counts. Normally, addressing and looping will take some overhead. The preferred embodiment strategy is thus to use regular shapes to reduce the number of loop levels.

Some DSPs have zero-overhead looping for one or two levels. Wth this feature, such DSPs possess one or more parameterized architecture kernels. For example, the C54xxx DSP has the instruction MAC*AR2+,*AR3+,A can be placed inside of a single-cycle inner-most loop without any overhead. This implements an N-wide kernel, N being programmable.

As a simple extension to the above kernel, the two MAC instructions
MAC*AR2,*AR3+,A
MAC*AR2+,*AR3+,B can be put inside a loop-block that is zero-overhead in the C54xxx DSP. This implements a 2-row N-wide architecture kernel.

Efficient architecture kernels on conventional DSPs are suaully regular-shaped. In addition, most resembling problems cannot be implemented with just one or two levels of "free" loops. At outer loops the use of DSP instruction for address adjustment and looping are needed. Most important aspects in parallel/vector DSP implementations, of keeping the data access pattern simple and regular, also apply to conventional DSPs. Consequently, the preferred embodiment methods applied to the accelerator in the following can be extended to resembling on conventional DSPs as well.

4. Two-Dimensional Image Resembling Implementations

An implementation of a resembling filter on a processor amounts to covering the data access block dots of the filter with circles of the architecture kernel of the processor. And the most efficient implementation is the one with the fewest circles of the architecture kernel not covering data access block dots. The number of dot covering combinations of is finite, so a search can find the most efficient implementation.

An example will illustrate the method for resembling (resizing) a digital image by a first pass over the image with a horizontal filtering using a one-dimensional filter followed by a second pass over the image with a vertical filtering using a second one-dimensional filter (which may be the same filter as used in the first pass). The first pass filtering resizes the image horizontally, and then the second pass resizes the horizontally-resized image vertically. Presume that the image samples are stored row-wise; that is, in memory adjacent samples correspond to horizontally adjacent image locations except at the ends of rows.

Consider a processor with the three architecture kernels shown in FIG. 6b and four looping levels; the image accelerator of the DSC25 from Texas Instruments Inc. includes such architecture kernels and provides four looping levels. And take as the one-dimensional resembling filter a 19-tap filter with resembling ratio of 5/8. More explicitly, 5/8 resembling with 19-tap, h(0), . . . ,h(18), has the following computations.

First, take x(0), x(1), x(2), . . . as the input sequence;

Second, upsampling by 5 yields:

u(0)=x(0), u(1)=0, u(2)=0, u(3)=0, u(4)=0, u(5)=x(1),u(6)=0, . . .

Third, lowpass filter with h( ), express as inner product format which correspond to h( ) with reversed-order coefficients and asymmetrical:

$$w(0)=u(0)h(0)+u(1)h(1)+u(2)h(2)+ \ldots +u(18)h(18)$$

$$w(1)=u(1)h(0)+u(2)h(1)+u(3)h(2)+ \ldots +u(19)h(18)$$

$$w(2)=u(2)h(0)+u(3)h(1)+u(4)h(2)+ \ldots +u(20)h(18) \ldots$$

$$w(8n)=u(8n)h(0)+u(8n+1)h(1)+u(8n+2)h(2)+ \ldots +u(8n+18)h(18) \ldots$$

Fourth, downsampling by 8 gives:

$$y(0)=w(0)$$

$$y(1)=w(8)$$

$$y(2)=w(16)$$

$$y(k)=w(8k)$$

Thus combining the foregoing:

$$y(0) = u(0)h(0) + u(1)h(1) + u(2)h(2) + \ldots + u(18)h(18)$$

$$= x(0)h(0) + x(1)h(5) + x(2)h(10) + x(3)h(15)$$

$$= \text{inner product of } [x(0), x(1), x(2), x(3)] \text{ with } H0$$

-continued $y(1) = u(8)h(0) + u(9)h(1) + u(10)h(2) + \ldots + u(26)h(18)$ $= x(2)h(2) + x(3)h(7) + x(4)h(12) + x(5)h(17)$ $=$ inner product of $[x(2), x(3), x(4), x(5)]$ with $H2$ $y(2) = u(16)h(0) + u(17)h(1) + u(18)h(2) + \ldots + u(34)h(18)$ $= x(4)h(4) + x(5)h(9) + x(6)h(14)$ $=$ inner product of $[x(4), x(5), x(6), x(7)]$ with $H4$ $y(3) = u(24)h(0) + u(25)h(1) + u(26)h(2) + \ldots + u(42)h(18)$ $= x(5)h(1) + x(6)h(6) + x(7)h(11) + x(8)h(16)$ $=$ inner product of $[x(5), x(6), x(7), x(8)]$ with $H1$ $y(4) = u(32)h(0) + u(33)h(1) + u(34)h(2) + \ldots + u(50)h(18)$ $= x(7)h(3) + x(8)h(8) + x(9)h(13) + x(10)h(18)$ $=$ inner product of $[x(7), x(8), x(9), x(10)]$ with $H3$ $y(5) = u(40)h(0) + u(41)h(1) + u(42)h(2) + \ldots + u(58)h(18)$ $= x(8)h(0) + x(9)h(5) + x(10)h(10) + x(11)h(15)$ $=$ inner product of $[x(8), x(9), x(10), x(11)]$ with $H0$ $=$ a repeat of $y(0)$ but with the $x(n)$ input offset 8;

an indication of the 5/8 resampling ratio.

$y(6) = u(48)h(0) + u(49)h(1) + u(50)h(2) + \ldots + u(66)h(18)$ $= x(10)h(4) + x(9)h(7) + x(14)h(12)$ $=$ inner product of $[x(10), x(11), x(12), x(13)]$ with $H4$ $=$ a repeat of $y(1)$ but with the $x(n)$ input offset 8;

again, showing the 5/8 resampling ratio.

resembling ratio.

Thus generally, for k in the range 0 to 4: $y(5n+k)=$inner product of the 4-vectors $[x(8n+m),x(8n+m+1), x(8n+m+2), x(8n+m+3)]$ and $Hj$ where m is the integer part of $(8k+4)/5$ and where j is in the range 0 to 4 and $j=-8k \mod[5]$. (H4 may be extended to have 4 coefficients by taking $H4=[h(4), h(9), h(14), 0]$.)

Note that for 5/8 resembling, the order of the five sub-filters is H0, H2, H4, H1, and H3. Whereas, the analogous computations for 5/7 resembling yields the order of the sub-filters as H0, H3, H1, H4, and H2, and for 5/6 resembling the order becomes H0, H4, H3, H2, and H1.

Figure 7A:
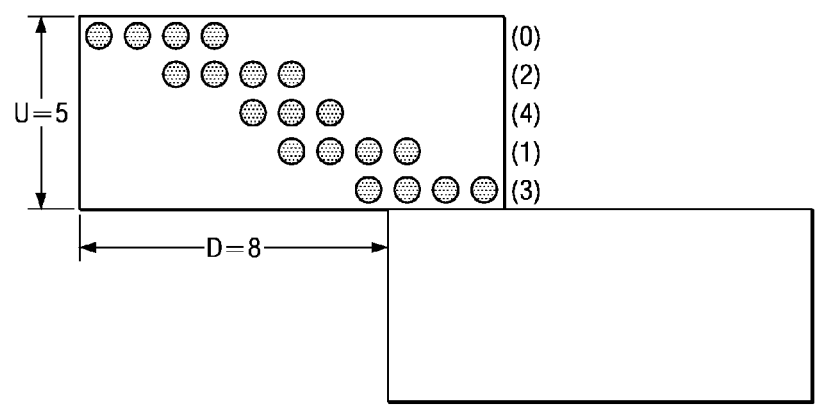
FIGS. 7a-7c show an example data access block and two access coverage charts for differing parallel outputs.

FIG. 7a shows the data access block for the 5/8 resembling filter with the height U=5, next block offset D=8, and overall filter length K=19 so that the length of each row of dots is K/U~4. The 5/8 resembling filter will first be applied to the digital image row-wise to convert an N×M image to a 5N/8×M image; and then the 5/8 resembling filter will be applied column-wise to this horizontally-resized image to yield the final 5N/8×5M/8 resized image.

Figure 7B:
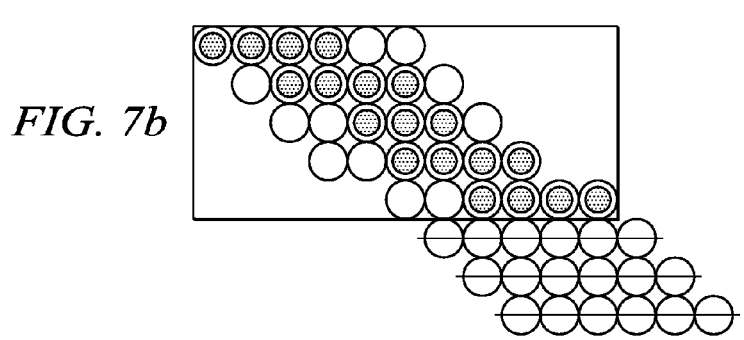

With a processor having four levels of loops, use the inner-most (fourth) level to accumulate over the filter coefficients of each sub-filter; that is, for the dots in a row of the access coverage chart. Each of the three architecture kernels has only one circle per row (that is, the processor does one MAC for each of the four inputs that are being processed in parallel), and so the inner-most loop needs at least ceiling [K/U] iterations; sometimes somewhat more due to the difference between U/D and the slope of the kernel pattern. For example, the "1:1 slope" kernel with the above 5/8 resembling 19-tap filter (FIG. 7a data access block), the parallel computation of 4 outputs, y(5n), y(5n+1), y(5n+2), y(5n+3), takes at least 6 iterations; namely, first iteration uses parallel inputs x(8n)–x(8n+3), second iteration parallel inputs x(8n+1)-x(8n+4), ., sixth iteration parallel inputs x(8n+5)-x(8n+8). FIG. 7b illustrates the 6 iterations as circles; circles without dots are MACs with a 0 coefficient for the sub-filter; that is, the sub-filters are extended to 6-vectors by inserting 0s.

The second inner-most (third level) loop is used to generate the U outputs of the data access block; for the 5/8 example U=5 and this takes 2 iterations because only 4 outputs are provided by the inner-most (fourth level) loop. Generally, ceiling[U/H] iterations for a kernel with H outputs. Explicitly for the 5/8 19-tap filter example, the first iteration of the third level loop has the fourth level loop computing y(5n), y(5n+1), y(5n+2), y(5n+3) and writing these 4 outputs to memory; then the second iteration increments the input by 7 from the first iteration starting point and replaces the sub-filters H0, H2, H4, H1 with the sub-filter H3 and three 0s, and then again executes the fourth level loop to compute 4 outputs: y(5n+4) and three zeros. These outputs are written to the next 4 memory locations, but the memory pointer will be decremented by 3 so the 3 zero outputs will be discarded by overwriting in the next calling of the third level loop. FIG. 7b illustrates this with the second iteration of the third level loop taking the input data starting point at the same data point as the end of the first iteration, x(8n+5), but with a 0 coefficient for the H3 sub-filter; see the initial empty circle on the fifth row. Alternatively, the second iteration could increment the input starting point by 1 or 2 from the end of the first iteration, x(8n+6) or x(8n+7). This would just shift the circles in the fifth row and change which the location of the two 0 coefficients added to H3.

The second and first loop levels are used for stepping the filtering along an image row and stepping through the rows of the image, respectively. In particular, for the 5/8 19-tap filter example, an iteration in the second level loop increments the input pointer by 8, and executes the third level loop which computes and writes to memory the next 5 outputs. Thus iterating the second level loop N/8 times corresponds to resembling a row of length N to yield a single row of length 5N/8. Then the outer-most (first level) loop steps through the rows of the image; the overall is a horizontal resizing by 5/8 with no vertical change.

Figure 8A:
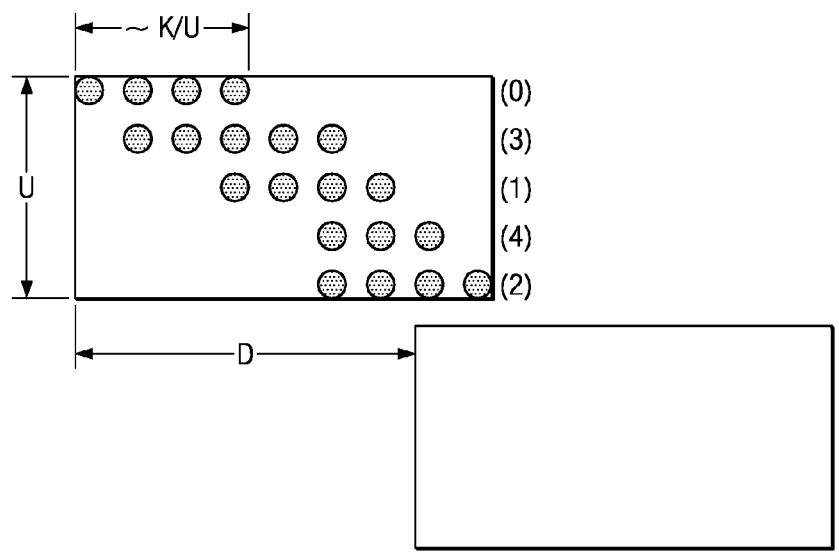
FIGS. 8a-8d show an example access coverage chart and horizontal plus vertical filtering implementations.
Figure 8C:
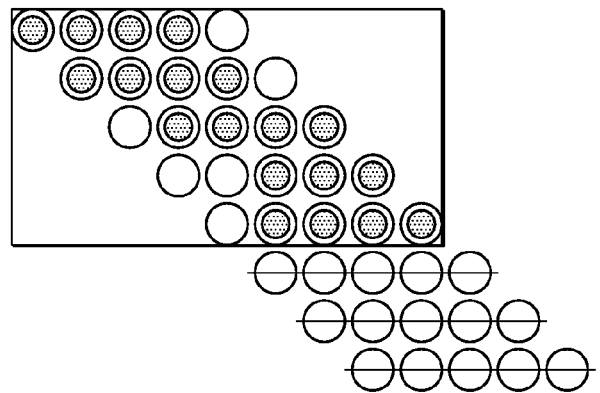
Figure 8D:
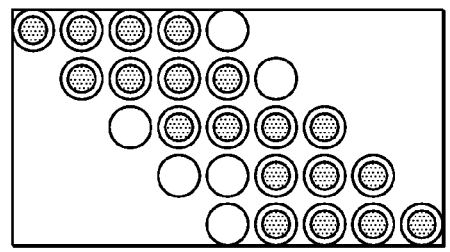
Figure 8B:
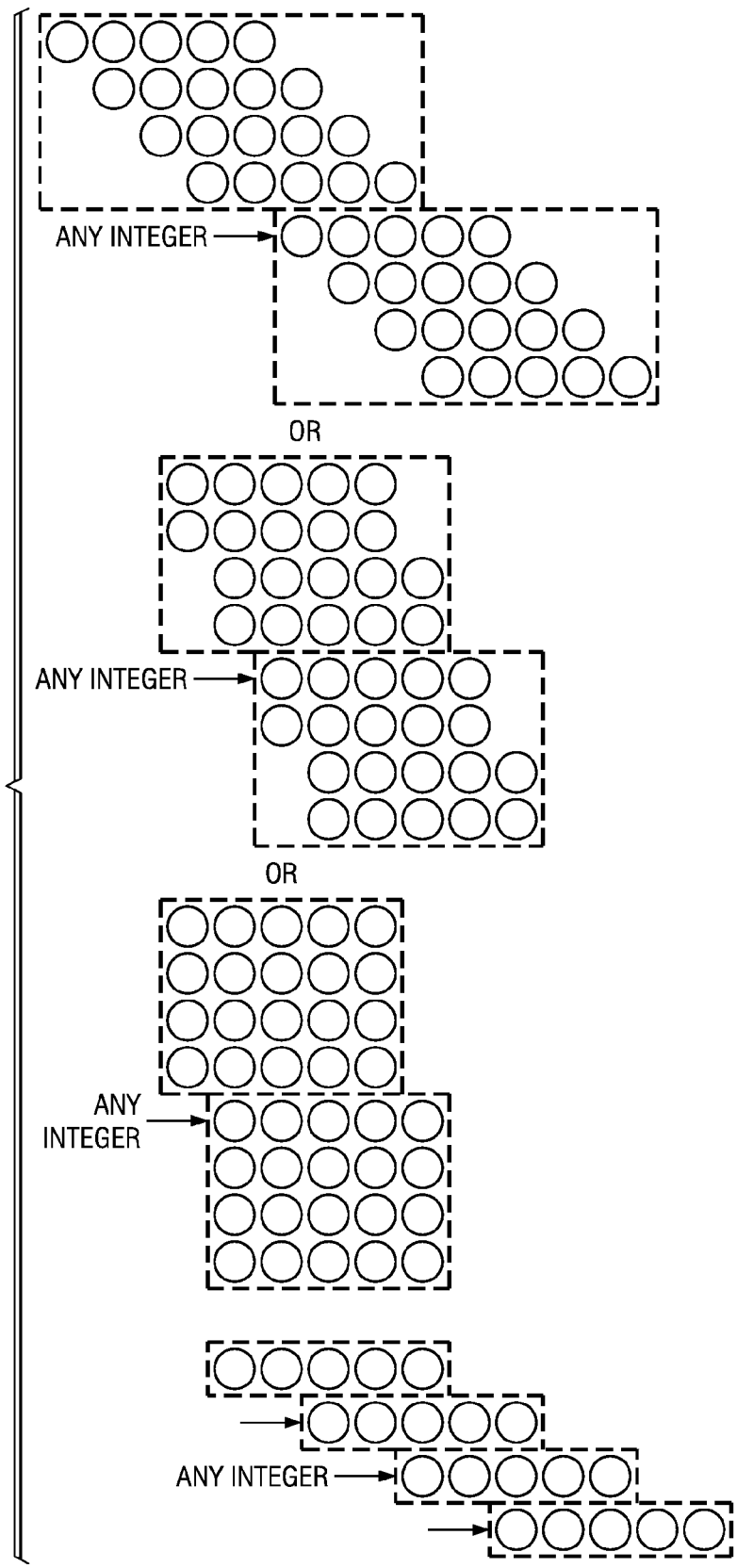

FIG. 8b shows the computations available from the three possible architecture kernels in the case of the inner-most loop having 5 iterations; and FIG. 8c shows the access coverage of the data access block of FIG. 8a by the computation pattern on the left in FIG. 8b (corresponding to the kernel denoted "1:1 slope" in FIG. 6b). The dots of the data access block more closely match the pattern of the "1:1 slope" architecture kernel because the slope of the band of dots is roughly 1 for the horizontal variable increasing to the right and the vertical variable increasing downwards. Indeed, the architecture kernel which best aligns with the U/D angle of the data access block should likely lead to the best coverage. Thus with the architecture kernels of FIG. 6b, when U/D is much less than 1, use the "1:1 slope", when U/D roughly equals 2, use the "2:1 slope" kernel, and when U/D is much greater than 2, use the "4 tall" kernel. Of course, the optimum kernel is found by searching over the three possibilities. The access coverage chart, FIG. 8c, for the 5/8 resembling 19-tap filter shows an implementation in which the sub-filters (rows) are 5-tap type FIR filters. The differences for general 5-tap filters are that (a) this is a 5-phase filter (U=5), after computing 8 outputs, shift the input pointer by 8 samples, and (c) after writing out 8 outputs, roll back the output pointer by 3 which discards the last 3 outputs by subsequent overwriting. The access coverage chart denotes the discard by the 3 strikeout rows.

Figure 7C:
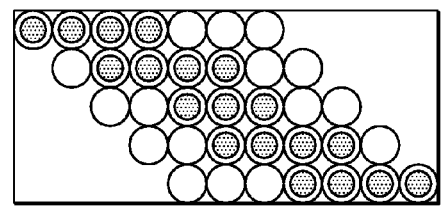

In an access coverage chart the circles that cover dots represent meaningful computations, and the circles that are empty represent wasted computation (multiplying 0s or producing outputs that will be discarded). The efficiency of an implementation can be clearly observed as the ratio of the number of circled dots divided by the total number of circles. In the example of FIG. 8c, the efficiency is 19/40=47.5%. Simiarly, for the 5/8 resembling example, FIG. 7b shows the access coverage chart if 4 parallel outputs were available as in FIGS. 8a-8c; and as a contrast, FIG. 7c shows the access coverage chart if 5 parallel outputs had been available. Note that with 4 parallel outputs the sub-filter length is 6, but a second iteration of the third level loop is needed and three 0 sub-filters are used, so the efficiency is 19/48=39.6%. In contrast, with 5 parallel outputs available the filter length would be 7, but only a single third level loop iteration is needed, and the efficiency is 19/35=54.3%.

During the second pass of one-dimensional vertical filtering, columns of the horizontally-resampled image are processed in parallel. Each one-dimensional filtering problem is really use of the single-circle architecture kernel. Address generation allows implementation of any regular shape coverage. Indeed, with four levels of loops, use the inner-most (fourth) level to cover the filter coefficients of each sub-filter; that is, for the dots in a row of the access coverage chart which correspond to an image column. More explicitly for the 5/8 19-tap example, let $w(j,k)$ denote the 5/8-horizontally-resized image from the first pass filtering; then the single output $y(j,5n)$ is the inner product of H0 and the 4-vector $[w(j,8n), w(j,8n+1), w(j,8n+2), w(j,8n+3)]$. So the row of dots in the access coverage chart represent these inputs which are stored at successive addresses (for resized rows of length 5N/8) $j+8n5N/8, j+(8n+1)5N/8, j+(8n+2)5N/8, j+(8n+3)5N/8$; that is, the input address generator increments by 5N/8, which is the number of samples a row of the horizontally-resized image. And the 4 MAC units could be outputting $y(j,5n), y(j+1,5n), y(j+2,5n), y(j+3,5n)$ in parallel; that is, each MAC units computes the inner product of H0 with the 4-vector starting at $w(j,8n), w(j+1,8n), w(j+2,8n),$ or $w(j+3,8n)$, respectively, and extending vertically. The inner-most loop iterations are the inner product computations.

The third level loop is used to generate the U phase outputs of the filter; that is, step through the sub-filters H0, H1, . . . , H(U−1) and for each sub-filter the corresponding vector of samples. Again with the 5/8 19-tap example, the third level loop successive computes the inner products of sample vectors with H0, H1, H2, H3, and H4. As noted in the previous paragraph, for the H0 filterings the 4 MAC units use successive 4-vectors $[w(j,8n), w(j,8n+1), w(j,8n+2), w(j,8n+3)], [w(j+1,8n), w(j+1,8n+1), w(j+1,8n+2), w(j+1,8n+3)], [w(j+2,8n), w(j+2,8n+1), w(j+2,8n+2), w(j+2,8n+3)], [w(j+3,8n), w(j+3,8n+1), w(j+3,8n+2), w(j+3,8n+3)]$, respectively. Then the second iteration computes the inner products of H1 with $[w(j,8n+1), w(j,8n+2), w(j,8n+3), w(j,8n+4)], [w(j+1,8n+1), w(j+1,8n+2), w(j+1,8n+3), w(j+1,8n+4)]$, and so forth. Note that the address generator for each MAC unit may increment by 5N/8 for each third loop iteration, the same as the fourth loop increments, and the offset of addresses between MAC units is just 1 (adjacent columns).

Thus the output of the inner-most and next level loops is a U tall by 4 wide resized-both-vertically-and-horizontally image. The second and first loop levels are used for repeat the processing horizontally to a desired larger output width and then repeating vertically for the height of the output array, which should be a multiple of U to be efficient.

Compared with the first pass horizontal resembling, the vertical resapling second pass loses one degree of freedom in data stepping through the data access block. In particular, the horizontal pass has the inherent parallelism of the 4 MAC units to yield 4 outputs, and the third level loop to step the 4-output processing through groups of 4 outputs for the U phases of the filter. The third level loop provides an opportunity to have an offset between-groups to adjust the slope of processing; see FIG. 7b which shows an offset of 5 in the fifth row (offsets of 6 or 7 could also have been used with different 0 coefficient padding for H3).

In contrast, the second pass vertical resembling uses the parallelism of the 4 MAC units to process 4 image columns independently. In terms of the data access pattern, only one output is generated by the inner-most (fourth level) loop. The two outer-most level loops provide width and height flexibility of the output array. Thus, there is only the third level loop to go down the data access pattern, and therefore any offset can be programmed between rows. For upsampling, this fixed offset per row provides less slope matching accuracy than the horizontal first pass. On the other hand, the third level loop can go for U iterations to compute exactly U rows in the data access block, compared to the 4*ceiling [U/4] rows that the horizontal pass is executing, and therefore a little bit of efficiency is regained.

The addressing freedom in vertical resembling works better for downsampling. For fractional upsampling, we have to pick between 1:1 slope (offset-1) or infinited slope (offset-0).

Note that the addressing freedom difference in the horizontal and vertical resembling is very specific to the processor architecture. The 4 levels of looping and the desire to have width-height flexibility leaves only one level for vertical pass to go through the U outputs. If we have more loop levels or can sacrifice either width or height looping (first or second level), we can use one more level and provide better slope control. If U or D is fixed at some convenient number, such as 8, 16, or 32, for data storage, we con do without either the output width loop or the output height loop, and give one more loop to intra-data-access-block control.

Similar to horizontal resembling, we look at the data access pattern, consider the addressing freedom we have, and devise an access coverage chart to implement the resembling. Without the 4-output grouping, we never have to produce redundant outputs. However, the reduced addressing freedom means sometimes we may have more multiplying-by-zero kind of wate. We have an overall efficiency of 19/25-76% with the FIG. 8c access coverge chart for the 54/8 resembling in the vertical pass.

5. Multiple resembling ratios

Following section 6 describes preferred embodiment generic resembling methods, a resembling method that determines how to implement U/D resembling given U and D, without any pre-computed information. However, frequently a resembling application has constraints on the set of resembling factors or the set is given. This section considers an example of a given set of resembling factors in order to provide an approach to generic section 6.

Consider the example of the set of resembling factors 4/3, 5/3, 2, 7/3, 8/3, 3, and 10/3. These are 1/3 steps that, together with a 3×optical zoom, provide 4×, 5×, . . . , 10× zoom capability for a digital camera. That is, U/D resembling with D=3 (or 1) and U in the set {2,3,4,5,7,8,10}. The following methodology also applies to other sets of resembling factors.

Figure 9:
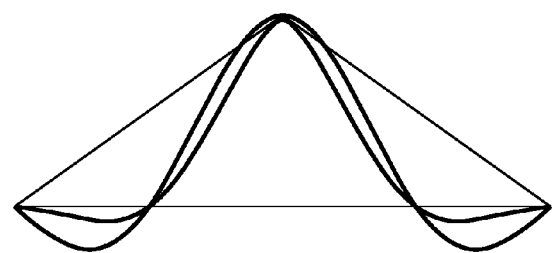
FIG. 9 graphs the sinc, window, and windowed sinc functions.

The example presumes use of the 4U-long filter kernel obtained by applying a 4U-wide triangular window on a sinc function. FIG. 9 illustrates the sinc function plus a triangular window function and the product filter kernel. The length of the filter is a tradeoff between computation complexity and signal (image) quality. A length of 4U is used in the example. Due to the window vanishing at the endpoints, so the first and last samples of the digitized filter kernel are 0. That is, for resembling factor of U/D, the digital filter kernel will be a (4U-1)-tap filter.

Figure 10:
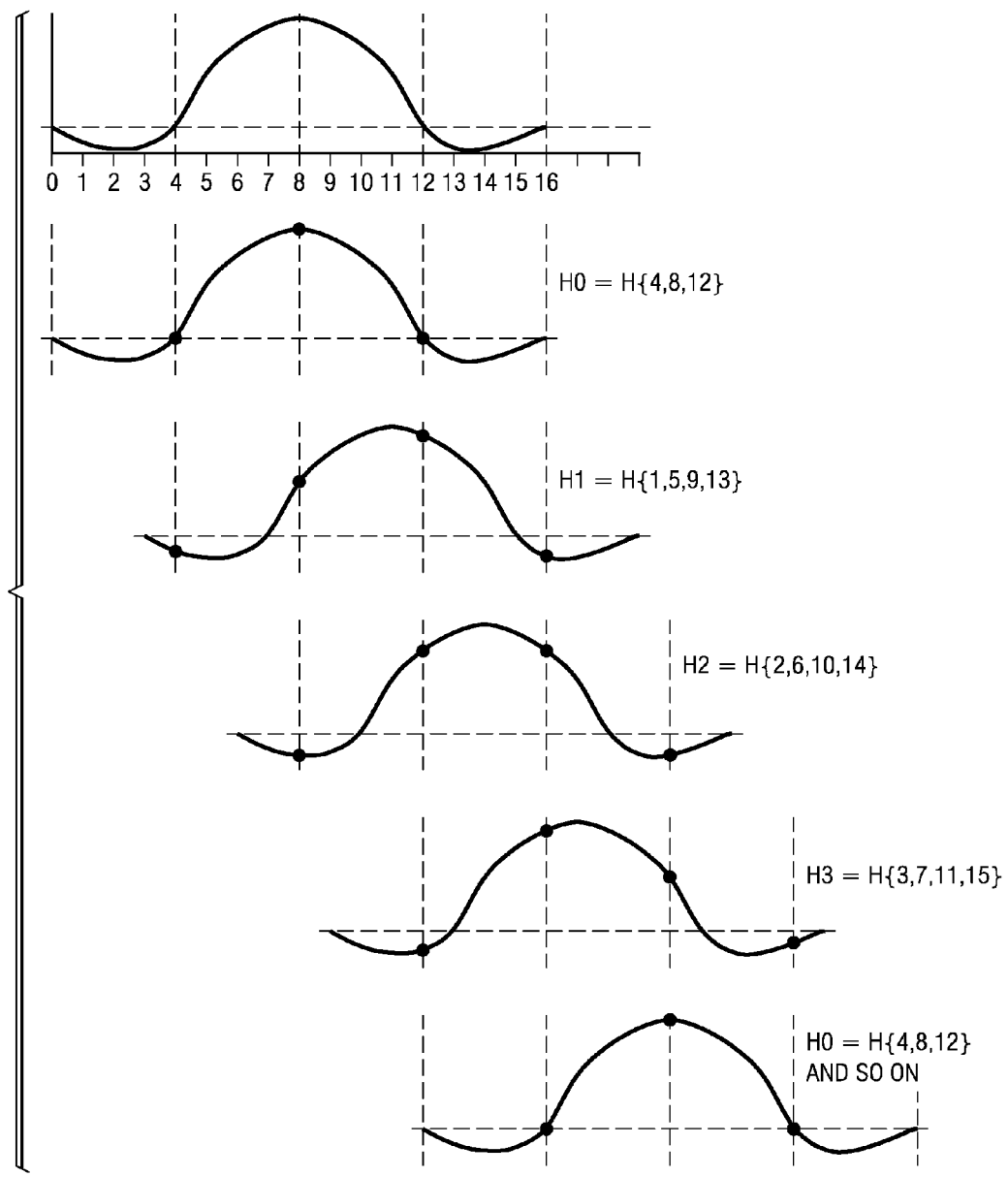
FIG. 10 are graphs of sub-filters of windowed sinc.

First consider the 4/3 resembling in detail. The filter length is 15 taps; but for convenience, index the filter coefficients from 0 to 16 where the $0^{th}$ and $16^{th}$ are both 0. For 4/3 resembling, there are U=4 phases (sub-filters) as shown in FIG. 10. Note that the input index is offset by 1 so that the center maximum of the sub-filter H0 multiplies $x(3j)$ as part of the inner-product computation for $y(4j)$. The inner products, denoted <|>, for one set of 4 outputs are:

$$y(4j)=<H0|[x(3j-1), x(3j), x(3j+1)]>$$

$$y(4j+1)=<H1|[x(3j-1), x(3j), x(3j+1), x(3j+2)]>$$

$$y(4j+2)=<H2|[x(3j), x(3j+1), x(3j+2)]>$$

$$y(4j+3)=<H3|[x(3j+1), x(3j+2), x(3j+3)]>$$

Figure 11:
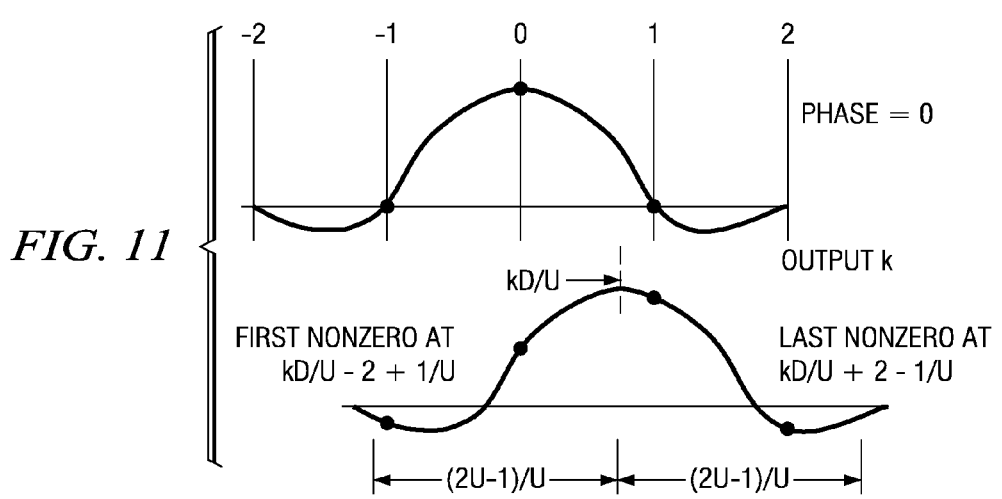
FIG. 11 shows offset of windowed sinc.

In general, $y(Ui+k)=$ $$<Hk'|[x(Dj+\text{ceiling}\{(kD-2U+1)/U\}), \ldots, x(Dj+\text{floor}\{(kD+2U-1)/U\})]>$$

where k'=-kD mod[U]. FIG. 11 illustrates this general expression.

Explicitly, the phases of the filters and the data access points for the set of resembling factors of the example are:

| | Output phase | Filter phase | First input | Last input |
|---|---|---|---|---|
| Zoom = 4/3 | 0 | 0 | -1 | 1 |
| | 1 | 1 | -1 | 2 |
| | 2 | 2 | 0 | 3 |
| | 3 | 3 | 1 | 4 |
| Zoom = 5/3 | 0 | 0 | -1 | 1 |
| | 1 | 2 | -1 | 2 |
| | 2 | 4 | 0 | 3 |
| | 3 | 1 | 0 | 3 |
| | 4 | 3 | 1 | 4 |
| Zoom = 4/2 | 0 | 0 | -1 | 1 |
| | 1 | 2 | -1 | 2 |
| | 2 | 0 | 0 | 2 |
| | 3 | 2 | 0 | 3 |
| Zoom = 7/3 | 0 | 0 | -1 | 1 |
| | 1 | 4 | -1 | 2 |
| | 2 | 1 | -1 | 2 |
| | 3 | 5 | 0 | 3 |
| | 4 | 2 | 0 | 3 |
| | 5 | 6 | 1 | 4 |
| | 6 | 3 | 1 | 4 |
| Zoom = 8/3 | 0 | 0 | -1 | 1 |
| | 1 | 5 | -1 | 2 |
| | 2 | 2 | -1 | 2 |
| | 3 | 7 | 0 | 3 |
| | 4 | 4 | 0 | 3 |
| | 5 | 1 | 0 | 3 |
| | 6 | 6 | 1 | 4 |
| | 7 | 3 | 1 | 4 |

-continued

| | Output phase | Filter phase | First input | Last input |
|---|---|---|---|---|
| Zoom = 3/1 | 0 | 0 | -1 | 1 |
| | 1 | 2 | -1 | 2 |
| | 2 | 1 | -1 | 2 |
| Zoom = 10/3 | 0 | 0 | -1 | 1 |
| | 1 | 7 | -1 | 2 |
| | 2 | 4 | -1 | 2 |
| | 3 | 1 | -1 | 2 |
| | 4 | 8 | 0 | 3 |
| | 5 | 6 | 0 | 3 |
| | 6 | 2 | 0 | 3 |
| | 7 | 9 | 1 | 4 |
| | 8 | 6 | 1 | 4 |
| | 9 | 3 | 1 | 4 |

Of these resembling fators, the factor 2 (=6/3) is implemented as 4/2 rather than just upsampling by 2 because the processor has 4 MAC units and this four-outputs in parallel is then more efficient. In contrast, the resembling factor 3 is left as upsampling by 3.

Figure 12A:
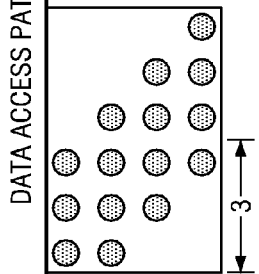
FIG. 12 lists data access patterns and access coverage charts.
Figure 12B:
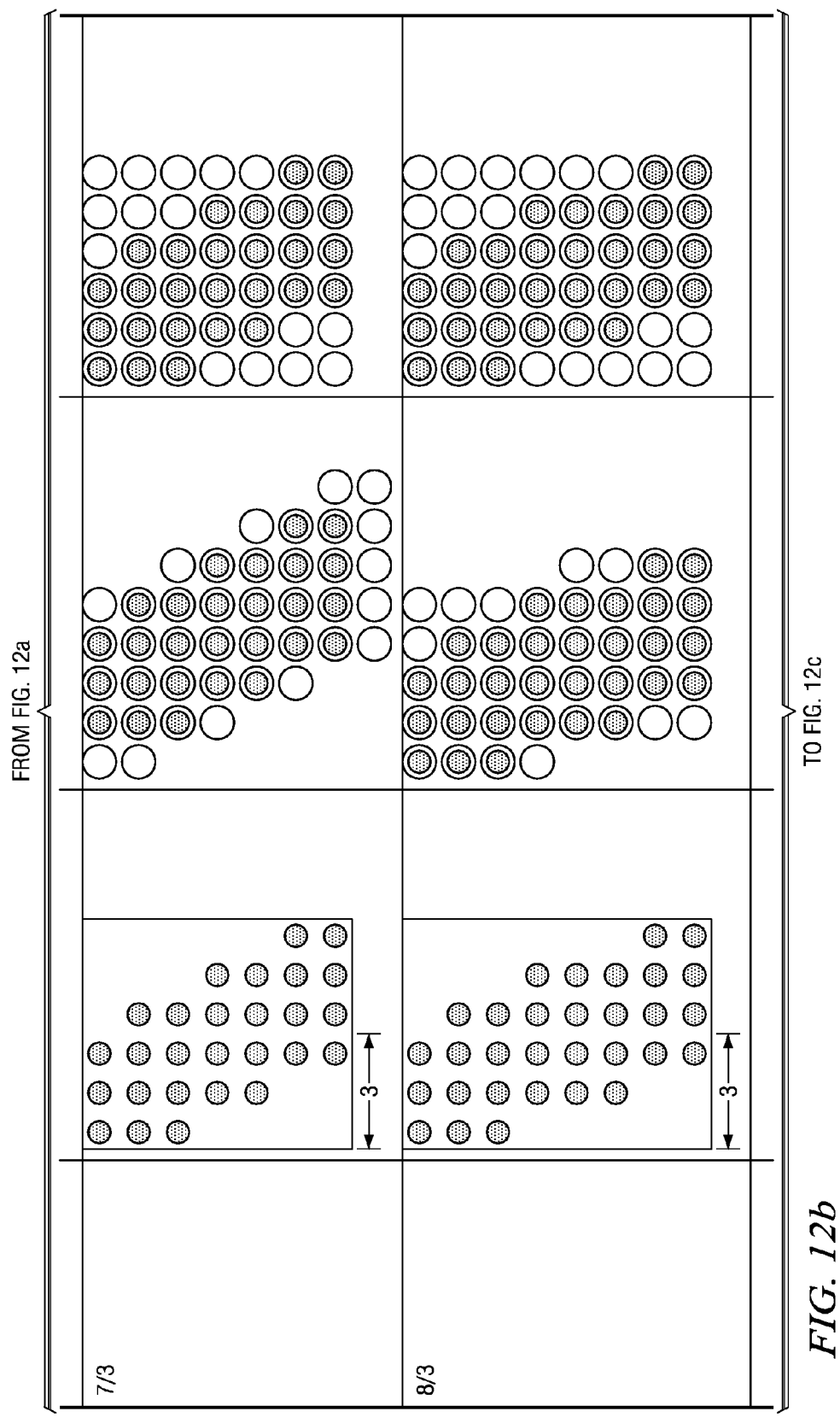
Figure 12C:
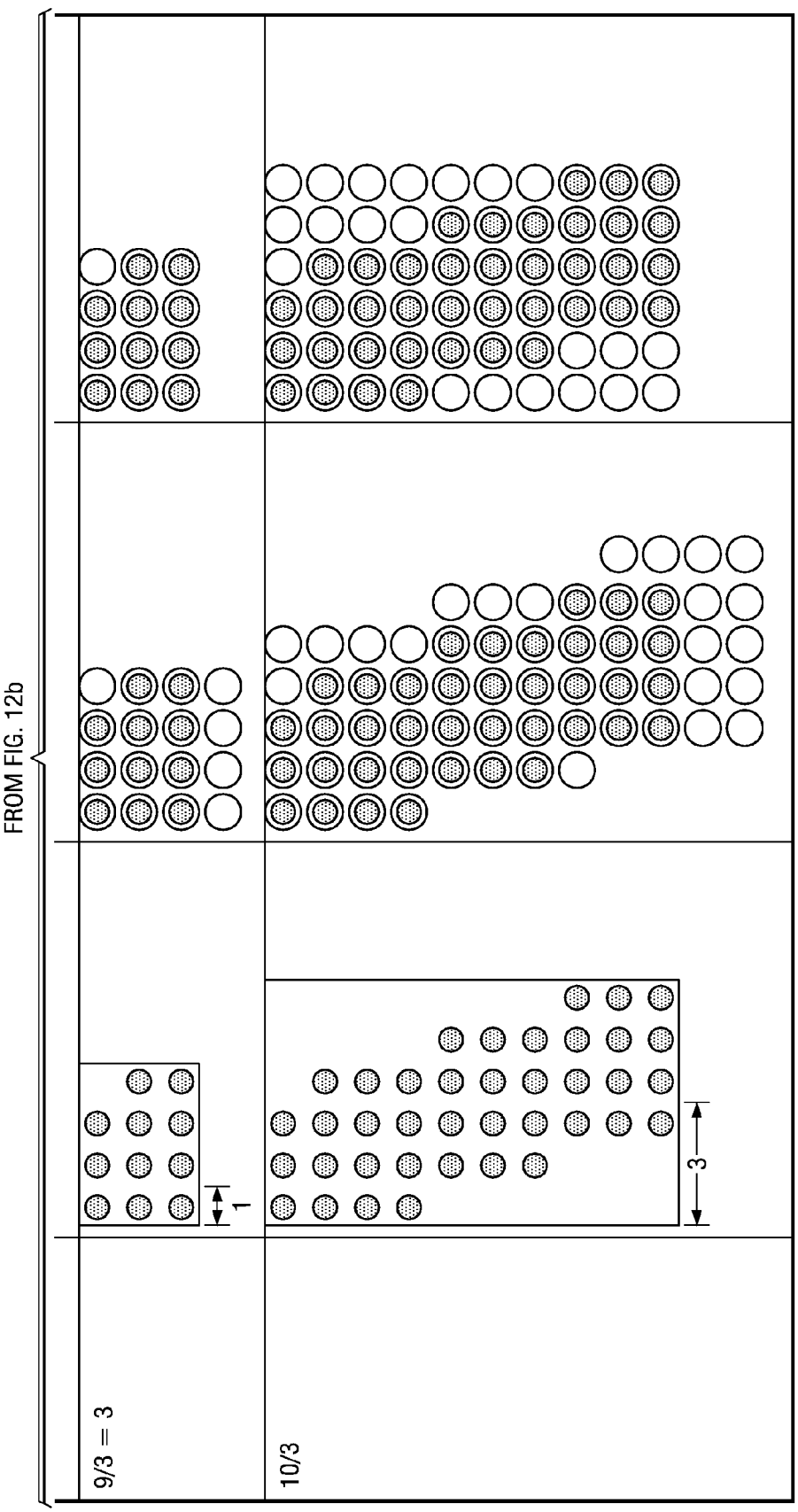

FIG. 12 shows the data access blocks for this set of resembling and kernels. These data access blocks were generated individually for each resembling factor by using (i) the general expression for y(&i+k) to find the input range for ech output phase (where to put the dots), (ii) the best fit architecture kernel of the three available for each resembling factor using the data step between output groups (kernel height), generally the collectiveheight of the access points is ceiling(U/kernel_height)*kernel_height, (iii) each access coverage chart also provides the origin of the access points, defined by the data index of the first access point; and (iv) and the resembling factor 2 was recast as 4/2 due to the 4 MAC unit structure. Thus pre-computed parameters to be used in a run-time digital zoom program (input parameters the resembling ratio U/D) would be: architecture kernel, Generalizing the foregoing example to other processors (different set of architecture kernels) and/or other resembling ratios requires other pre-computations. However, practical limitations on the ranges of the parameters should allow compact representation. In particular, the following ranges:

U and D in the range 1 to 8.

Architecture kernel height in the range 1 to 15.

Number of horizontal and vertical filter taps in the range 4 to M, where M=max(U*multiply_factor, D*multiply_factor) and multiply_factor is an integer such as 2 or 4 to insure sufficient filter coefficients in the case of small U.

Horizontal and vertical data starting point in the range -M to 0.

Horizontal and vertical output data step in the range 0 to M.

This means a description by two small numbers (multiply_factor, architecture kernel) of about 2-4 bits plus six numbers (two filter taps, two data starting points, and two output data steps) of byte size to specify each resembling ratio setup for resembling a two-dimensional image. Thus four 16-bit words should hold a resembling setup parameters. For example, FIG. 13 shows the parameters for the setups of FIG. 12.

To construct the filtering from the parameters, proceed as follows:

(a) compute the upsampling filter coefficients as samples of 4*max(U,D) long windowed sinc (=sinx/x) function.

(b) compute phase of sub-filter required for each of U outputs in a data access block.

(c) compute the starting and ending data points needed for each output.

(d) compute the starting data point accessed for each output (horizontally and vertically) by the architecture kernel, data step per group, and starting point.

(e) the difference between the first data point needed and the first data point accessed tells us how many leading zeros shoud be packed into the sub-fitler coefficient array.

(f) fill the sub-filter coefficients with the upsampling filter kernel samples with the phasing and zero-padding form step (e).

6. Multiple Resembling Ratios Generation at Run-Time

The preceding section 5 describes a manual process of looking up a set of resembling factors, capturing essential parameters, and using a run-time program to reconstruct the previously-determined filtering scheme based on the parameters. This is just one of four alternative approaches, from highly-precomputed to run-time determined, that are available for a digital zoom of the type described in section 5; these alternatives use pre-computed information together with a stored run-time program:

A. Pre-compute all the processor (e.g., 4 MAC units) commands, with filter coefficients pre-arranged and zero-padded according to access coverage charts. For seven resembling factors with sub-filters as in section 5, this roughly will take 7*2*20=280 16-bit words of commands and 2*(4+5+4+7+3+10)*10=820 words of filter coefficients, for a total of 1,100 words of pre-computed information for the 4-MAC-unit processor.

B. Pre-computed parameters sufficient to generate the commands (4 words per zoom factor as in FIG. 13); also include all filter coefficient values, pre-arranged and zero-padded according to coverage charts, roughly 820 words for the sub-filters of section 5, which totals roughly 850 words.

C. Pre-compute parameters sufficient to generate the processor commands, but the program generates the filter coefficients plus commands. This takes about 7*4=28 words for the set of seven resembling factors; sinc and windowing functions for filter coefficients are computed online, and the sinc function, in particular, needs a sine function that can take up some code space.

D. Use a processor program to plan resembling on-the-fly, construct filter coefficients and MAC unit commands without any pre-computed information.

The level of difficulty and code size in a digital zoom program increases with a decrease in pre-computed information. The procedure described in foregoing section 5 follows alternative C. Alternative D can be realized by following the reasoning of section 3, and the program can be simplified by relaxing optimality in searches.

With a small set of zoom factors, alternative A probably achieves the smallest overall program/data size. A modest-sized set of zoom factors suggests alternative C; and a large set of possible zoom factors demands alternative D.

Note that the program of alternative D could be run off-line to generate parameters. Then capture the parameters for a simpler run-time program (e.g., alternative C) to expand the parameters into a full implementation. Similarly, if there are so few resembling factors that alternative A produces smaller program plus data than alternative C, then the MAC commands can be captured by running alternative C offline and use alternative A for run-time.

FIG. 1 shows the steps of a program of alternative D with inputs U and D. The steps execute for both a horizontal pass and for a vertical pass of a two-dimensional zoom as with the example of section 5; the steps will be explained in detail after the following listing.

(a) compute the coefficients of the phase 0 to phase U−1 sub-filters from the 4*max(U,D) samples of the windowed sinc function; this also provides relative first and last data points needed for each sub-filter;

(b) pick a multiply factor if the value of U is small;

(c) for each architecture kernel available, make a first estimate of a data step per (output) group by the integer closest to H*D/U, and consider five estimates for the data step per group as: the first estimate, the first estimate ±1, and the first estimate ±2;

(d) for each combination of architecture kernel plus data step per group estimate, compute the best starting data point and best sub-filter length (number of taps);

(e) for each combination with starting data point and sub-filter length from (d), register the computation cost (basically, the sub-filter length); (f) pick the combination with the minimal computation cost (fewest sub-filter taps) for the resembling implementation.

In more detail, there are eight parameters for each resembling factor, U/D, and an exhaustive search through all the combinations takes on the order of $M^3$ trials where M is max(U,D). This would be tolerable for an offline program, but not for run-time. Thus reduce the search space at the expense of resembling efficiency, but if we set all the parameters to work with any case, we lose efficiency in the resembling. For example, we know that all required data accesses fit inside the box in the data access block, taking U*(D+ceiling(K/U)) multiply-accumulates, while only K multiply-accumulates are required. However, for the example of section 5, there are only three kernels for the horizontal pass and one kernel for the vertical pass, so iteration through all choices is fine. The multiplying factor (multiply_factor in FIG. 13) is needed to get sufficient numbers of outputs to make use of the 4-way parallelism of the 4-MAC processor, so a simple rule is used: when U=1, take multiply_factor=4, when U=2 take multiply_factor=2, otherwise, multiply_factor=1 (no change).

The architecture kernel decides the fine structure of the MAC edge, and the data step per group decides the big picture. (For a small U that needs only one group in the horizontal pass because U is not greater than H, the kernel height, the architecture kernel alone sets the edge.) The data step per group thus should have the edge match U/D. Thus guess at the optimal data step per group value as the closest integer to H*D/U and then consider the −2, −1, 0, +1, +2 increments of this first guess data step per group value to capture the best value. Thus for the example of section 5 there are 15 combination of architecture kernel and data step per group for the horizontal pass (3 kernels and 5 data step per group values), and 5 combinations for the vertical pass.

For each combination of architecture kernel and data step per group, the optimal starting data access point can be computed as follows. Let mac_edge[i] be the first_data point accessed for phase i output, relative to the first_data point accessed for phase 0 output; this just indicates the shape of the kernel. For example, presume the "2:1 slope" kernel with a data_step_per_group of 2 (such as for the 7/3 resembling of FIG. 12), then mac_edge[1]=0 because the phase 1 sub-filter output is aligned with the phase 0 sub-filter output in the "2:1 slope" kernel, mac_edge[2]=mac_edge[3]=1 again from the "2:1 slope", mac_edge[4] mac_edge[5]=2 from the data_step_per_group=2, and mac_edge[6]=3 (for the 7/3 example, the phase 7 output is not used, so ignore mac_edge[7]). Then define the data point to start the kernel at, using mac_edge[0]=0:

data_start_best=min$_i$ (first_data required[i]–mac_edge[i])

where first_data_required[i] is the first_data point used in the phase i output sub-filter. Again with the 7/3 example, if n=first_data_required[O], then first_data_required[1]=first_data_required[2]=n, first_data_required[3]=first_data_required[4]=n+1, and first_data_required[5]=first_data_required[6]=n+2. Thus data_start_best =n−1; that is, one data point before the first_data point needed by the phase 0 output; the empty circle in the first row of the 7/3 example reflects this.

Then the number of taps needed (with all sub-filters padded to the same number of taps) is num_taps_best=min$_i$ (last_data_required[i]–mac_edge[i]–data_start_best)

where last_data_required[i] is the last_data point needed for the phase i output. So once more with the 7/3 example and the first_data needed again called n, last_data_required[0] =n+2, last_data_required[1]=last_data_required[2]=n+3, last_data_required[3]=last_data_required[4]=n+4, and last_data_required[6]=n+5. Thus num_taps_best=5 as shown in the 7/3 example by the rows being 5 circles long.

Thus the computation cost of the combination, "2:1 slope" and data_-step_per_group=2, registers as 5-tap sub-filters. FIG. 13 shows the corresponding parameter values for the FIG. 12 example; note that the phase 0 sub-filter has a center peak which is aligned to input data point 0, which leads to the starting access data point being −2 as listed in FIG. 13 for the 7/3 horizontal.

Also for comparison in the 7/3 example, the computational cost of the combination of "2:1 slope" with data_step_-per_group=3 would be as follows. First, mac_edge[1]=0, mac_edge[2]=mac_edge[3]=1, mac_edge[4]=mac_edge[5]=3 from the data_step_per_group=3, and mac_edge[6]=4. Next, first_data_-required[i] remained unchanged, so data_start_best changes from n−1 (where n denotes the first_data needed by the phase 0) to n−2 because of the increase in either mac_edge[4] or mac_edge[6]. That is, the increase in data_step_per_group causes the start to be two data points before the first need data point of the phase 0; and this, in turn, leads to an increase in num_taps_best from 5 to 6. Thus the computation cost is higher for the combination "2:1 slope and data_-step_per_group=3, and combination is rejected. Similarly for the other combinations, so the 7/3 combination selected for the horizontal pass is the one shown in FIG. 12.

What is claimed is:

1. A method of resampling a data sequence to resize a digital image, comprising:
   (a) providing filter coefficients according to an input resembling ratio U/for resizing a digital image where U and D are positive integers, said coefficients grouped into U sub-filters according to phase and corresponding to a data access block;
   (b) for each of a plurality of architecture kernels:
      (i) provide a step per group of H of said sub-filters from a first set of integers about H*D/U where H is the height of said architecture kernel;
      (ii) for each of said steps from said first set, find a length for said sub4i/ters according to an access coverage chart for said data access block;
   (c) using the architecture kernel and the step corresponding to a minimum of said lengths of step (b)(ii) to filter an input digital image data sequence;
   (d) outputting the filtered digital image to a storage medium or a display.

2. The method of claim 1, wherein:
   (a) said fifter coefficients of step (a) of claim 1 are samples of a windowed sinc function.

3. The method of claim 1, wherein:
   (a) said input data sequence is an image; and
   (b) of claim 1 is a horizontal resampling.

4. A digital camera zoom, comprising:
   (a) an input for zoom selection; and
   (b) parallel processing circuitry coupled to said zoom selection input and operable to resample an image by
      (1) providing filter coefficients according to a resampling ratio dependent upon an input zoom selection, said coefficients grouped into sub-filters according to filter phase and corresponding to a data access block;
      (2) for each of a plurality of architecture kernels of said parallel processing circuitry (i) provide a step per group of said sub-filters from a first set of integers corresponding to the height of said architecture kernel and said resampling ratio, (ii) for each of said steps from said first set, find a length for said sub-filters according to an access coverage chart for said data access block; and
      (3) using the architecture kernel and the step corresponding to a minimum of said lengths of step (b)(ii) to filler said image.

* * * * *